Oct. 30, 1951     M. P. BROWN     2,572,982
CAGED FLOAT FLUSH CONTROL VALVE
Filed Aug. 8, 1949     2 SHEETS—SHEET 1
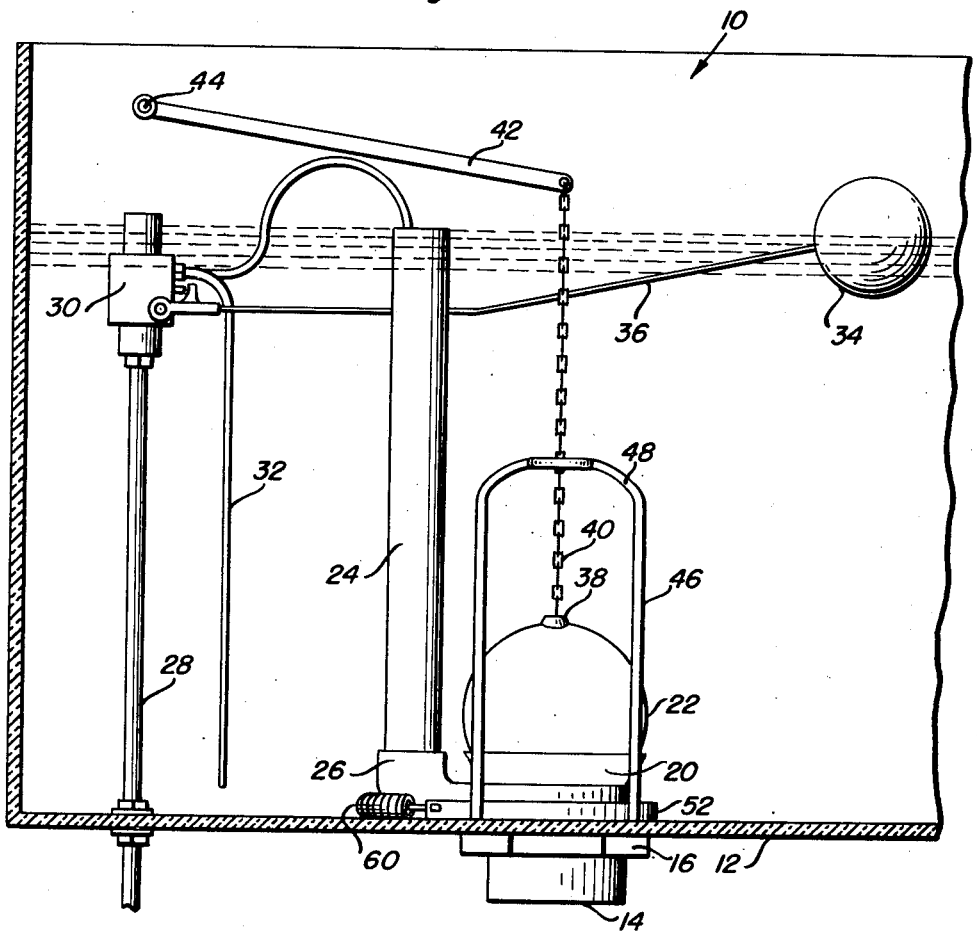
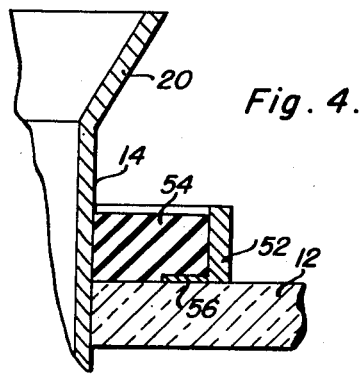
Martin P. Brown
INVENTOR.

Oct. 30, 1951  M. P. BROWN  2,572,982
CAGED FLOAT FLUSH CONTROL VALVE
Filed Aug. 8, 1949  2 SHEETS—SHEET 2

Martin P. Brown
INVENTOR.

BY *Clarence A. O'Brien*
*and Harvey B. Jacobson*
Attorneys

Patented Oct. 30, 1951

2,572,982

UNITED STATES PATENT OFFICE 2,572,982

CAGED FLOAT FLUSH CONTROL VALVE

Martin P. Brown, Bremerton, Wash.

Application August 8, 1949, Serial No. 109,217

2 Claims. (Cl. 4—57)

This invention appertains to a float valve assembly for flush tanks, and has for its primary object to guide the float valve or conventional rubber ball in its upward and downward movement, during the flushing operation, so that the valve is at all times in vertical alignment with the valve seat formed on the discharge or flush conduit.

Another important object of this invention is to prevent improper seating of the ball and to enable the ball to be self-centering.

Another important object of this invention is to provide easier flushing by obviating guide rod friction and providing a direct pull from the flush lever through a flexible connector to the ball.

Another important object of this invention resides in the provision of a guide cage for the ball, the cage being inexpensively and simply constructed and being adapted for use in any type of tank so that no alterations will be necessary to install the device in existing flush tanks.

These and ancillary objects and structural features of merit are attained by this invention, the preferred embodiment of which is set forth in the following description and illustrated in the accompanying drawings, wherein:

Figure 1 is a fragmentary vertical section through a conventional flush tank, illustrating in elevation the conventional parts of the tank and illustrating the novel valve assembly, constructed in accordance with the principles of this invention;

Figure 4 is a fragmentary sectional view taken on line 4—4 of Figure 3.

Figure 2:
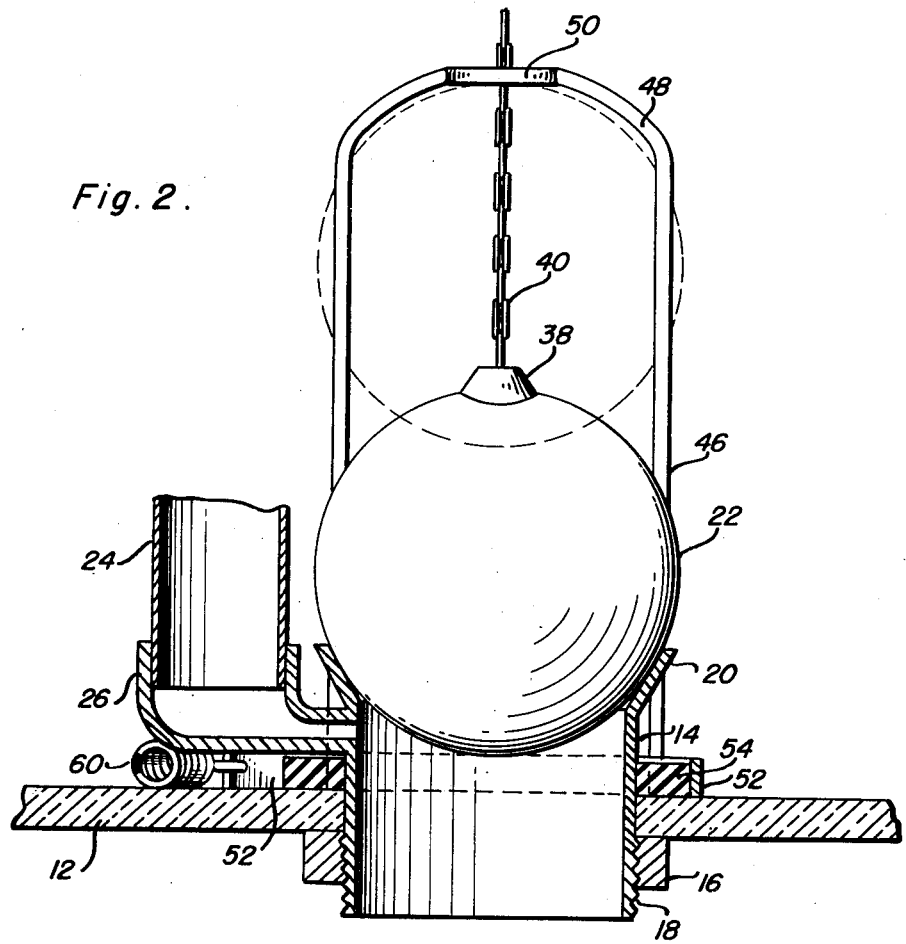
Figure 2 is an enlarged elevational view of the valve assembly, partly in section, illustrating the same installed within the tank.
Figure 3:
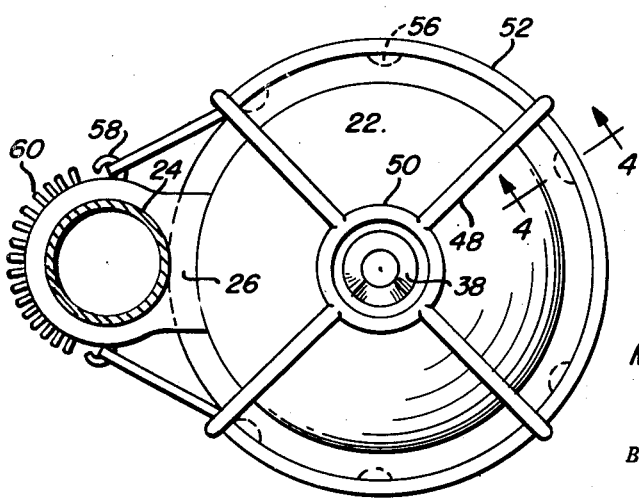
Figure 3 is a top plan view of the valve assembly.

Referring now more particularly to the drawings, a conventional flush tank 10 is illustrated and includes a substantially closed bottom wall 12 through which is inserted a discharge or flush conduit 14, the latter being held within the bottom wall by means of a sealing nut 16 secured on the externally threaded portion 18 of the conduit. The conduit is formed at its inner end with a funnel shaped valve seat 20, within which is normally seated a buoyant valve or rubber ball or bulb 22. An overflow pipe 24 is connected to the discharge or flush conduit by an intermediate joint 26. A water inlet pipe 28 extends through the bottom wall 12 of the tank and a valve assembly 30 is provided at the upper end of the pipe to control the filling of the tank through the filling pipe 32, the valve assembly being controlled by the float 34 carried by the valve actuating arm 36. The sphere-shaped bulb or ball 22 is formed at its upper end with a reinforced raised section 38 to which is attached a corrosion-resistant flexible connector 40, the upper end of the connector being secured to a rocker arm or flush lever 42 which controls the removal of the ball from the valve seat and which is actuated by a trip handle 44.

A plurality of rods 46 are vertically disposed in the tank and surround the discharge conduit and the ball 22, the rods forming a cage for the ball. The upper ends 48 of the rods are bent inwardly relative to each other and are secured in equidistant fashion to a ring 50 through which the connector 40 is disposed. The inturned ends 48 of the rods and the ring function to limit the upward movement of the ball and also to center the connector 40 with respect to the ball so that a direct upward pull is imparted to the ball upon upward movement of the flush lever 42. The lower ends of the rods are secured to a split clamping ring 52, which is formed of corrosion-resistant metal. A rubber seal 54 is concentrically disposed about the inner portion of the discharge conduit and is secured thereto and secured to the bottom wall 12 of the tank. The band 52 is formed at its lower edge with inwardly directed, circumferentially spaced fingers 56 which are adapted to engage under the ring 54 and prevent upward movement of the band 52.

The opposing ends of the band 52 are suitably apertured to receive the opposing hook ends 58 of a connecting coil spring 60, which function to clamp the band on the sealing ring 54, the spring being secured about the under side of the intermediate connecting joint 26.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A float valve assembly for a flush tank having an outlet flushing conduit formed with a valve seat comprising a ball adapted to normally seat in the valve seat, lifting means for said ball, vertical guide rods for said ball surrounding said conduit and ball, the upper ends of said rods being bent inwardly relative to each other, a ring secured to the converging upper ends in vertical alignment with the conduit, said ring limiting the upward movement of the ball, a sealing ring concentrically disposed about the conduit and seated on the bottom of the tank, a split band secured to the lower ends of the rods, said band being disposed about the sealing ring, means formed on said band for engaging under said sealing ring to prevent upward movement of the band and means for clamping said band about the ring and embracing the overflow pipe in the tank.

2. The combination of claim 1, wherein said means formed in the band includes a plurality of circumferentially spaced projecting fingers.

MARTIN P. BROWN.

REFERENCES CITED

The following references are of record in the file of this patent:

UNITED STATES PATENTS

| Number | Name | Date |
|---|---|---|
| 941,283 | Snaman | Nov. 23, 1909 |
| 1,232,690 | Keenan | July 10, 1917 |
| 1,237,109 | Shoppe | Aug. 14, 1917 |
| 1,439,268 | Shoppe et al. | Dec. 19, 1922 |
| 1,799,770 | Wegner | Apr. 7, 1931 |
| 2,190,147 | Ciaccio et al. | Feb. 13, 1940 |
| 2,257,292 | De Garmo | Sept. 30, 1941 |
| 2,328,701 | Woodrum | Sept. 7, 1943 |